United States Patent [19]
Furusawa

[11] Patent Number: 5,708,646
[45] Date of Patent: Jan. 13, 1998

[54] OPTICAL DISK DEVICE

[75] Inventor: Kouji Furusawa, Tokyo, Japan

[73] Assignee: NEC Corporation, Japan

[21] Appl. No.: 780,988

[22] Filed: Jan. 9, 1997

[30] Foreign Application Priority Data

Jan. 9, 1996 [JP] Japan .................. 8-001425

[51] Int. Cl.$^6$ .................................. G11B 7/00
[52] U.S. Cl. .................... 369/112; 369/44.32
[58] Field of Search ................ 369/112, 44.32, 369/44.26, 58, 44.15, 44.14, 54; 250/201.1

[56] References Cited

U.S. PATENT DOCUMENTS

| | | | |
|---|---|---|---|
| 5,051,975 | 9/1991 | Tadokobo et al. | 369/44.32 |
| 5,179,544 | 1/1993 | Hezemans et al. | 369/215 |

FOREIGN PATENT DOCUMENTS

| | | |
|---|---|---|
| 62-165732 | 7/1987 | Japan . |
| 2189732 | 7/1990 | Japan . |

OTHER PUBLICATIONS

Hitoshi Nakamaru; "Laser Disc Technical Book"; Nov. 1, 1986; p. 97; Ascii.

Primary Examiner—Nabil Hindi
Attorney, Agent, or Firm—Hayes, Soloway, Hennessey, Grossman & Hage, P.C.

[57] ABSTRACT

Disclosed is an optical disk device, which has: an optical disk; an optical head for writing or reading out information on or from the optical disk; a tilt sensor for detecting an inclination of an information recording surface of the optical disk; a head holding member for holding the optical head and the tilt sensor; a guide rail for guiding the head holding member to move in the direction of a radius of the optical disk; a seek mechanism for giving a reciprocative movement force in the direction of the radius of the optical disk to the head holding member; and a tilt mechanism for adjusting an inclination of the head holding member to the optical disk on information obtained from the tilt sensor; wherein the optical head and the tilt sensor are disposed on the head holding member and are opposite to each other while sandwiching the optical disk with respective predetermined clearances from the optical disk.

10 Claims, 5 Drawing Sheets

OPTICAL DISK DEVICE

FIELD OF THE INVENTION

This invention relates to an optical disk device, and more particularly to, an optical disk device in which a tilt sensor for detecting an inclination of an information recording surface of an optical disk is provided.

BACKGROUND OF THE INVENTION

FIG. 1 shows a conventional optical disk device which comprises an optical head 51 for writing or reading out information on or from an optical disk 100, a tilt sensor 52 which detects an inclination of an information recording surface of the optical disk 100, a carrier 53 which holds the optical head 51 and the tilt sensor 52 on the back side of the optical disk 100, a thread rail 54 which guides the carrier 53 to move in the direction of a radius of the optical disk 100, and a rail holding member 55 which positions the thread rail 54 along the radius of the optical disk 100 as well as holding both ends of the thread rail 54.

The rail holding member 55 is up and down movably supported by fulcruming a rotation support shaft 55a which is provided below the central part of the optical disk 100. Under one end of the rail holding member 55, a tilt mechanism 62 is provided. The tilt mechanism 62 comprises a disk-like cam 56 which gives the moving-up force to the rail holding member 55 by rotating under the end of the rail holding member 55, a stepping motor 57 which gives a predetermined rotation power to the cam 56.

Furthermore, a seek mechanism 58 is provided which controls a reciprocating movement of the carrier 53 along the thread rail 54. The seek mechanism 58 comprises a rack gear 59A attached to the carrier 53, a pinion gear 59B which drives the rack gear 59A, and a stepping motor 61 which gives a rotation power through a drive gear 61a and gears 60a, 60b to the pinion gear 59B.

In operation, the tilt sensor 52, which is disposed near an objective on the optical head 51, projects infrared rays in parallel with an axis of laser light on an information recording layer of the optical disk 100, then sensing the direction and deviation of reflected infrared rays, thereby detecting the inclination of the information recording surface of the optical disk 100. Then, on the information of the tilt sensor 52, the tilt mechanism 62 is actuated to cancel the inclination. The carrier 53 mounted with the optical head 51 is inclined through the rail holding member 55, so that the laser light axis of optical head 51 can be controlled to be perpendicular to the information recording surface of the optical disk 100.

However, the above optical disk device has some problems. The first problem is that the laser light axis is not always perpendicular to the information recording surface of the optical disk 100, even when the light axis of the infrared rays projected from the tilt sensor 52 is inclined to be perpendicular to the information recording surface of optical disk 100. This is because, though the tilt sensor 52 is disposed on the same plane as the optical head 51, the tilt sensor 52 projects the infrared rays on a position apart from a laser spot which is formed on the information recording surface of the optical disk 100 by the laser light emitted from the optical head 51 not to disturb the information reading function of the optical head 51 when it detects the inclination of the information recording surface.

For the purpose of solving this problem, Japanese patent application laid-open No.2-189732(1990) discloses an optical disk device in which a tilt sensor is disposed on the same track that an optical head reads out data and is placed on a position precedent to the optical head. However, even in this case, there occurs a time difference until the optical head reaches a track position detected by the preceding tilt sensor, and track curvatures are different between the inside track and outside track of the optical disk. Therefore, it is difficult for the position of the tilt sensor to be always placed on the same track that the optical head is reading out data.

The second problem is that, when the laser light axis of the optical head 51 is inclined by the tilt mechanism 62, the objective is simultaneously required to follow up the movement of the tilt mechanism 62 by using a focusing servo-mechanism and a tracking servomechanism. This is because, since the rotation axis of the tilt mechanism 62 does not pass through the laser spot on the information recording surface of the optical disk 100, the position of laser spot on the optical disk 100 and the distance of the optical disk 100 and the objective is varied, as compared to before the movement of the tilt mechanism 62, according as the laser light axis is inclined by the tilt mechanism 62.

For the purpose of solving this problem, Japanese patent application laid-open No.62-165732(1987) discloses an optical disk device in which the laser light axis of an optical head is adjusted by inclining to a virtual center defined by a laser spot on the information recording surface of an optical disk. However, even in this case, since, in the adjustment of fabrication, the inclination of the laser light axis of the optical head is absolutely fixed to a predetermined reference value, it is impossible to follow up the variation of the inclination of the optical disk with the rotation of optical disk. As a result, it is insufficient for solving the above problem.

SUMMARY OF THE INVENTION

Accordingly, it is an object of the invention to provide an optical disk device in which a laser light axis of optical head can be always controlled to be perpendicular to an information recording surface, and a high-precision read-out of information from an optical disk can be performed over a long time.

According to the invention, an optical disk device, comprises:
  an optical disk;
  an optical head for writing or reading out information on or from the optical disk;
  a tilt sensor for detecting an inclination of an information recording surface of the optical disk;
  a head holding member for holding the optical head and the tilt sensor;
  a guide rail for guiding the head holding member to move in the direction of a radius of the optical disk;
  a seek mechanism for giving a reciprocative movement force in the direction of the radius of the optical disk to the head holding member; and
  a tilt mechanism for adjusting an inclination of the head holding member to the optical disk on information obtained from the tilt sensor;
  wherein the optical head and the tilt sensor are disposed on the head holding member and are opposite to each other while sandwiching the optical disk with respective predetermined clearances from the optical disk.

In the above invention, the optical head projects laser light on the information recording surface of the optical disk and reads out information from a laser spot formed on the information recording surface. On this time, the tilt sensor projects infrared rays on the reverse surface to the information recording surface of the optical disk where the laser spot is formed, thereby detecting an inclination of the reverse surface to the light axis of infrared rays from the tilt sensor on the direction and deviation of the reflected infrared rays. The tilt motor inclines the head holding member to have an angle that the light axis of infrared rays from the tilt sensor and the reverse surface are perpendicular to each other. Since the tilt sensor and optical head are held on the head holding member such that the laser light axis of the optical head coincides with the light axis of the infrared rays of the tilt sensor, if the front and back surfaces of the information recording layer of the optical disk are parallel to each other and the light axis of infrared rays is perpendicular to the reverse surface, the laser light axis of the optical head necessarily becomes perpendicular to the information recording surface.

BRIEF DESCRIPTION OF THE DRAWINGS

The invention will be explained in more detail in conjunction with the appended drawings, wherein.

DESCRIPTION OF THE PREFERRED EMBODIMENTS

An optical disk device in the first preferred embodiment will be explained in FIG. 2.

Figure 1:
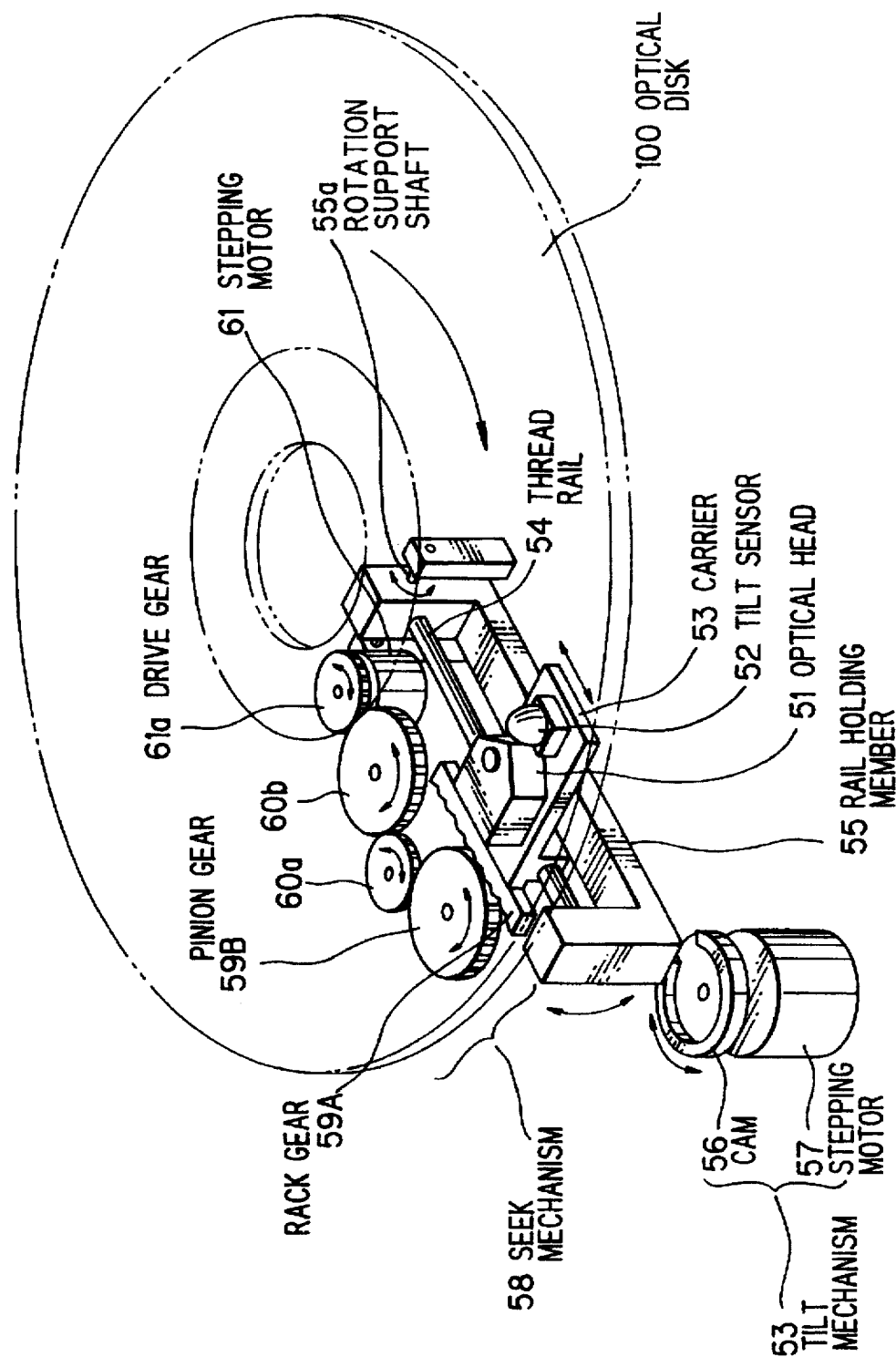
FIG. 1 is a perspective view showing a conventional optical disk device.
Figure 2:
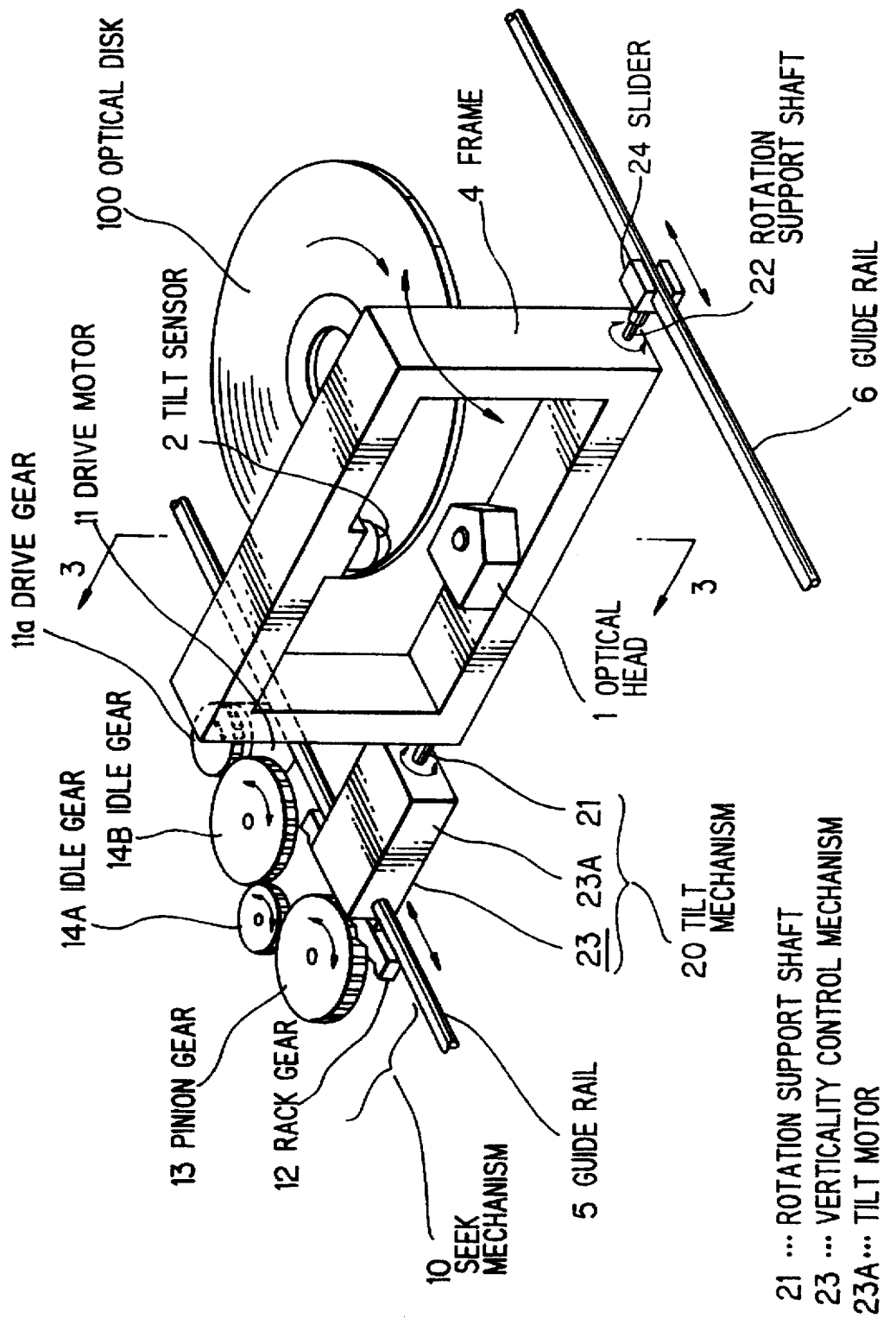
FIG. 2 is a perspective view showing an optical disk device in a first preferred embodiment according to the invention.

In FIG. 2, an optical disk is indicated by 100, an optical head for writing or reading out information on the optical disk 100 is indicated by 1, and a tilt sensor for sensing an inclination of an information recording surface of the optical disk 100 is indicated by 2. The tilt sensor 2 and optical head 1 are held by a frame 4 provided as an head holding member.

The frame 4 is formed as a rectangle with a size to allow a free insertion of the optical disk 100, and it is installed such that it can reciprocatively move in the direction of a radius of the optical disk 100 while being guided by guide rails 5, 6. Adjacent to the frame 4, a seek mechanism 10 which gives a reciprocative movement force in the direction of a radius of the optical disk 100 to the frame 4 is disposed.

The optical head 1 and tilt sensor 2 are placed at positions on the frame 4, e.g., above and below the optical disk 100 as shown in FIG. 2, where they are opposite to each other as they sandwich the optical disk 100 with respective predetermined clearances from the optical disk 100. The inclination of the frame 4 to the optical disk 100 can be controlled by a tilt mechanism 20 on information of the tilt sensor 2.

The tilt mechanism 20 comprises rotation support shafts 21, 22 which are coaxially attached to the ends of the frame 4 to rotatably support the frame 4, and a perpendicularity control mechanism 23 by which the perpendicularity of the frame 4 to the optical disk 100 is adjusted such that a center axis line common to the optical head 1 and tilt sensor 2 mounted on the frame 4 becomes perpendicular to the optical disk 100.

The perpendicularity control mechanism 23 comprises a tilt motor 23A which rotatively drives the frame 4 within a predetermined angle through the rotation support shaft 21 and holds it at a specified stop position, and a motor control circuit(not shown) which controls the rotation of the tilt motor 23A on information of the tilt sensor 2. Herein, a case covering the tilt motor 23A is slidably engaged with the guide rail 5, and the rotation support shaft 22 is slidably engaged through a slider 24 with the guide rail 6.

Furthermore, the rotation support shafts 21, 22 are fixed on the frame 4 such that an axis line lying between the rotation support shafts 21, 22 passes through a laser spot projected on the information recording surface of the optical disk 100.

Particularly explaining this by referring to FIG. 2, the optical head 1 projects laser light on the information recording surface of the optical disk 100 and reads out data on the information recording surface. The tilt sensor 2 projects infrared rays on the back side of the information recording surface of the optical disk 100 and detects an inclination of the light axis of the infrared rays to the projected surface of the optical disk 100 on the reflection direction and deviation.

The frame 4 holds the optical head 1 and tilt sensor 2 at a position that the laser light axis of the optical head 1 coincides with the light axis of the infrared rays of the tilt sensor 2 and the optical head 1 and tilt sensor 2 are opposite to each other while sandwiching the optical disk 100 in the middle point therebetween. Herein, the tilt motor 23A has a function that rotates the frame 4 around the rotation support shafts 21, 22 such that the light axis of infrared rays from the tilt sensor 2 and the information recording surface of the optical disk 100 are perpendicular to each other.

Since the frame 4 and tilt mechanism 20 are, as explained before, slidably attached to the guide rails 5, 6, they can move in the direction of a radius of the optical disk 100 by the seek mechanism 10 to position the optical head 1 nearby a target track on the optical disk 100.

The seek mechanism 10 comprises a drive motor 11 with a drive gear 11a, a rack gear 12 attached along the guide rails 5, 6 to the case covering the tilt motor 23A, a pinion gear 13 engaging with the rack gear 12, and idle gears 14a, 14b disposed between the pinion gear 13 and the drive motor 11. In this composition, the rotation force of the drive motor 11 is transmitted from the drive gear 11a through the idle gears 14a, 14b and the pinion gear 13 to the rack gear 12, thereby slidably moving the frame 4 and tilt mechanism 20 while being guided by the guide rails 5, 6 in the direction of a radius of the optical disk 100.

In operation, where the optical disk 100 is formed as a plane whose front side and back side are parallel to each other, the seek mechanism 10 is first actuated, thereby the optical head 1 moves nearby a target track on the information recording surface of the optical disk 100 and then projects laser light on the information recording surface (a back surface in FIG. 2) of the optical disk 100 to read out data thereon. On this time, the tilt sensor 2 projects infrared rays on the reverse surface (a front surface in FIG. 2) to the information recording surface of the optical disk 100 where the laser spot is formed, thereby detecting an inclination of the information recording surface of the optical disk 100 to the light axis of infrared rays from the tilt sensor 2 on the direction and deviation of the reflected infrared rays.

The inclination of the optical disk 100 detected by the tilt sensor 2 is output to a tilt servo-control circuit (not shown) for conducting a proper signal processing, then being output as a rotation command signal through the motor control circuit (not shown) to the tilt motor 23A.

Figure 3:
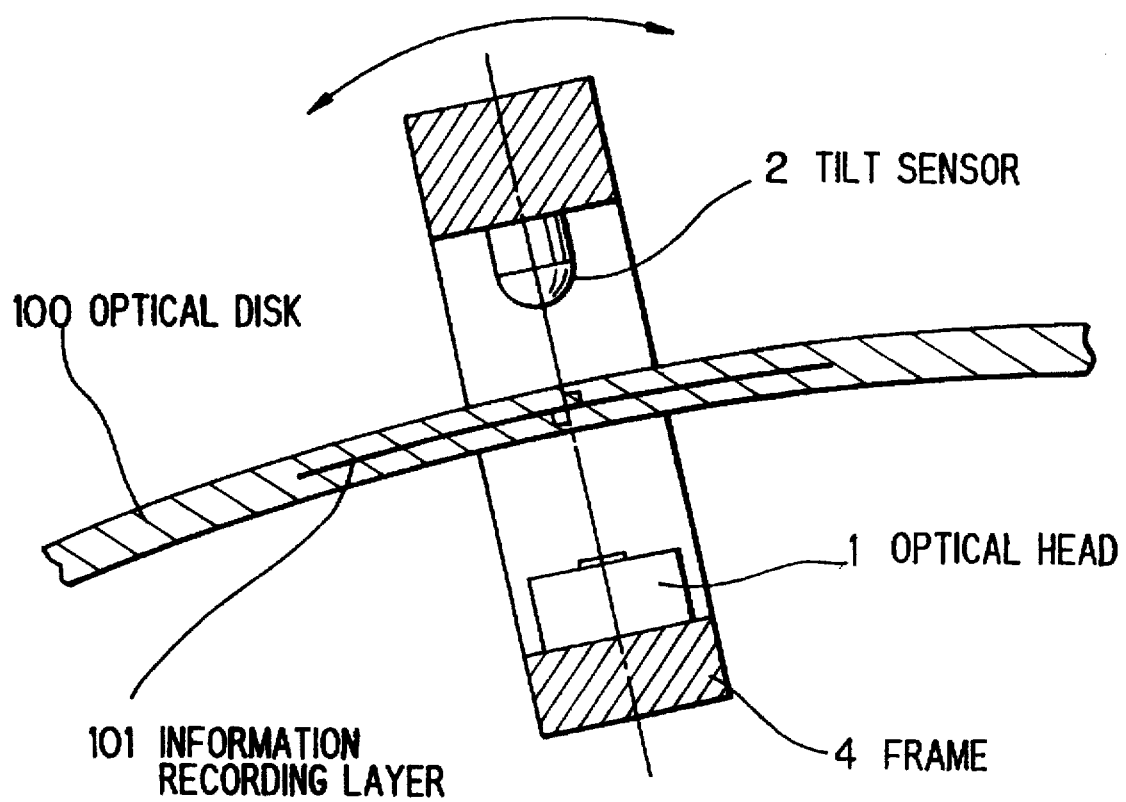
FIG. 3 is a sectional view cut along the line A—A in FIG. 2.

The rotation command signal output to the tilt motor 23A includes a command that, on the inclination information of the information recording surface of the optical disk 100 to be detected by the tilt sensor 2, the tilt motor 23A inclines the frame 4 to have an angle that the light axis of infrared rays from the tilt sensor 2 and the information recording surface of the optical disk 100 are perpendicular to each other. According to the rotation command signal from the tilt servo-control circuit, the tilt motor 23A controls the inclination of the frame 4 to always keep the light axis of infrared rays from the tilt sensor 2 perpendicular to the information recording surface of the optical disk 100. FIG. 3 shows a state that the light axis of infrared rays from the tilt sensor 2, i.e., the axis light axis of the optical head 1, becomes perpendicular to the information recording surface of the optical disk 100 by controlling the inclination of the frame 4.

Thus, in this embodiment, the light axis of infrared rays from the tilt sensor 2 is always held to be perpendicular to the back surface of the information recording surface on the information recording layer 101 of the optical disk 100. In this state, the tilt sensor 2 and optical head 1 are, as described before, held on the frame 4 such that the laser light axis of the optical head 1 coincides with the light axis of the infrared rays of the tilt sensor 2 and the optical head 1 and tilt sensor 2 are opposite to each other while sandwiching the optical disk 100 in the middle point therebetween. Therefore, if the surfaces of the information recording layer 101 are parallel to each other, by holding the light axis of infrared rays to be perpendicular to the reverse surface to the information recording surface on the information recording layer 101, the laser light axis of the optical head 1 necessarily becomes perpendicular to the information recording surface.

Figure 4:
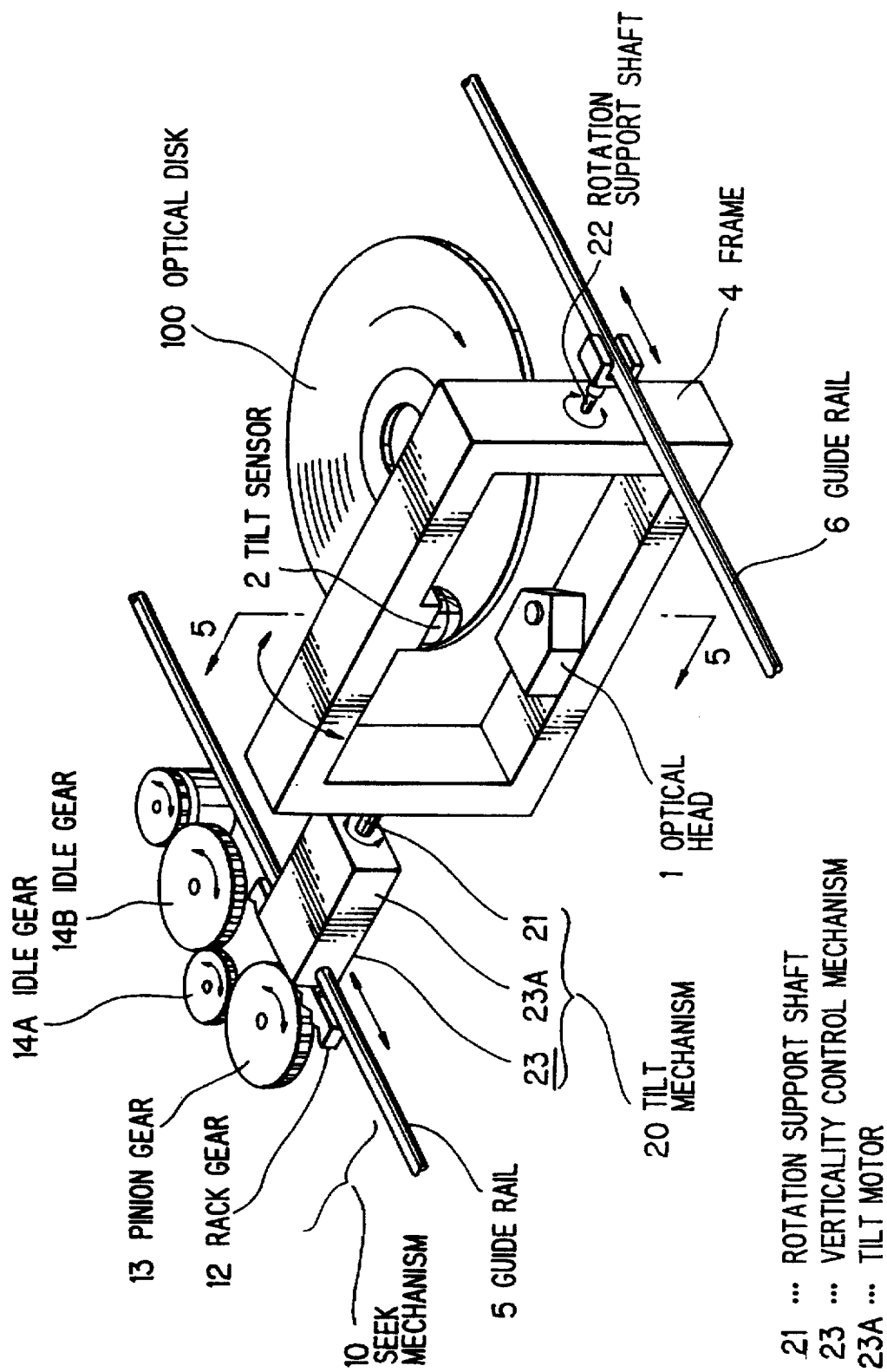
FIG. 4 is a perspective view showing an optical disk device in a second preferred embodiment according to the invention.
Figure 5:
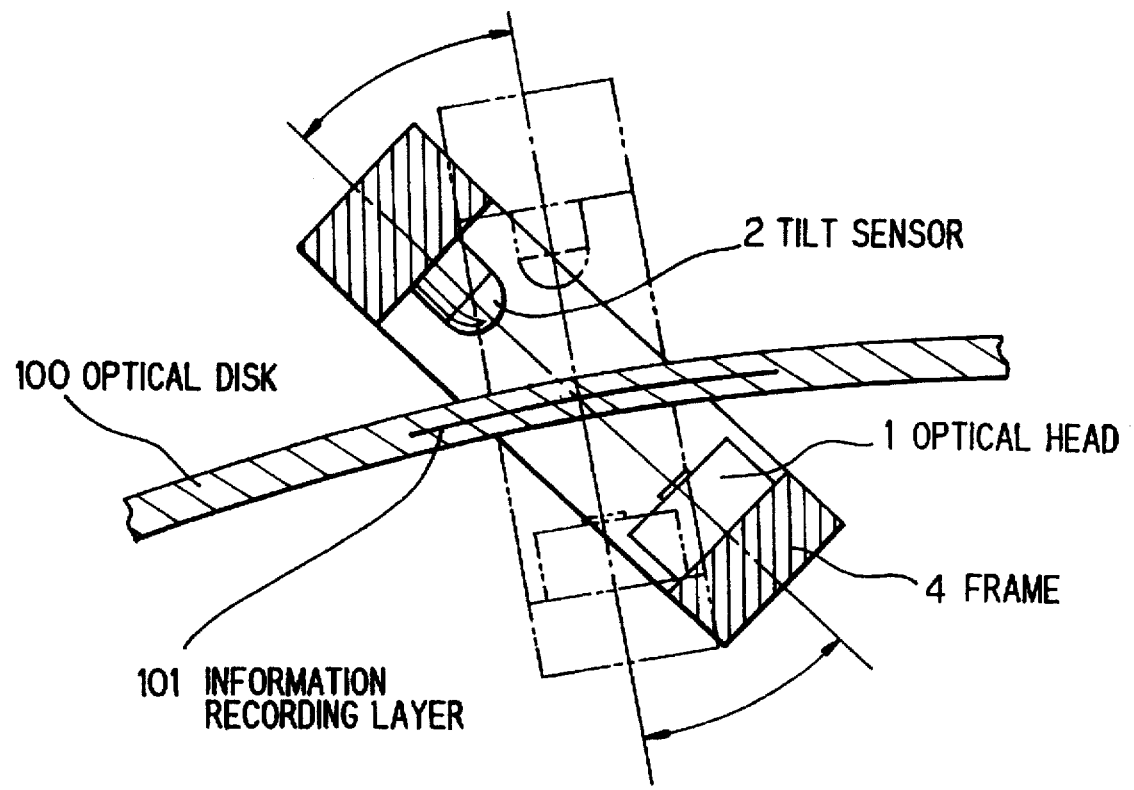
FIG. 5 is a sectional view cut along the line B—B in FIG. 4.

An optical disk device in the second preferred embodiment according to the invention will be explained in FIG. 4, wherein like parts are indicated by like reference numerals as used in FIG. 2.

In the second embodiment, the rotation support shafts 21, 22 of the frame 4 are disposed to pass through a laser spot to be formed on the optical disk 100. The other composition is identical with that in the first embodiment. Namely, the optical disk device in the second embodiment has the same effect as the first embodiment. Moreover, since the rotation support shafts 21, 22 of the frame 4 are disposed to pass through a laser spot, even if the laser light axis of the optical head 1 is inclined as the frame 4 rotates around the rotation support shafts 21, 22 by to an operation of the tilt mechanism 10, the position of laser spot on the optical disk 100 and the distance of the optical disk 100 and the objective is little varied. As a result, the read-out precision of the optical head 1 can be always kept high.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical disk device, comprising:
   an optical disk;
   an optical head for writing or reading out information on or from said optical disk;
   a tilt sensor for detecting an inclination of an information recording surface of said optical disk;
   a head holding member for holding said optical head and said tilt sensor;
   a guide rail for guiding said head holding member to move in the direction of a radius of said optical disk;
   a seek mechanism for giving a reciprocative movement force in said direction of said radius of said optical disk to said head holding member; and
   a tilt mechanism for adjusting an inclination of said head holding member to said optical disk on information obtained from said tilt sensor;
   wherein said optical head and said tilt sensor are disposed on said head holding member and are opposite to each other while sandwiching said optical disk with respective predetermined clearances from said optical disk.

2. An optical disk device, according to claim 1, wherein said head holding member is formed as a rectangular frame with a size to allow a free insertion of said optical disk.

3. An optical disk device, according to claim 1, wherein said tilt mechanism comprises rotation support shafts which are coaxially attached to the ends of said head holding member to rotatably support said head holding member, and a perpendicularity control mechanism by which a perpendicularity of said head holding member to said optical disk is adjusted such that a center axis line common to said optical head and said tilt sensor mounted on said head holding member becomes perpendicular to said optical disk.

4. An optical disk device, according to claim 2, wherein said tilt mechanism comprises rotation support shafts which are coaxially attached to the ends of said head holding member to rotatably support said head holding member, and a perpendicularity control mechanism by which a perpendicularity of said head holding member to said optical disk is adjusted such that a center axis line common to said optical head and said tilt sensor mounted on said head holding member becomes perpendicular to said optical disk.

5. An optical disk device, according to claim 3, wherein said perpendicularity control mechanism comprises a tilt motor which rotatively drives said head holding member within a predetermined angle through one of said rotation support shafts and holds said head holding member at a specified stop position.

6. An optical disk device, according to claim 4, wherein said perpendicularity control mechanism comprises a tilt motor which rotatively drives said head holding member within a predetermined angle through one of said rotation support shafts and holds said head holding member at a specified stop position.

7. An optical disk device, according to claim 3, wherein said rotation support shafts are attached to said head holding member such that an axis line lying between said rotation support shafts passes through a laser spot projected on said information recording surface of said optical disk.

8. An optical disk device, according to claim 4, wherein said rotation support shafts are attached to said head holding member such that an axis line lying between said rotation support shafts passes through a laser spot projected on said information recording surface of said optical disk.

9. An optical disk device, according to claim 5, wherein said rotation support shafts are attached to said head holding member such that an axis line lying between said rotation support shafts passes through a laser spot projected on said information recording surface of said optical disk.

10. An optical disk device, according to claim 6, wherein said rotation support shafts are attached to said head holding member such that an axis line lying between said rotation support shafts passes through a laser spot projected on said information recording surface of said optical disk.

* * * * *